United States Patent [19]
Wilson

[11] 3,918,823
[45] Nov. 11, 1975

[54] THREADED STRUCTURE
[76] Inventor: Alexander Wilson, 4820 Thunderbird Circle, Apartment 306, Boulder, Colo. 80303
[22] Filed: Oct. 11, 1974
[21] Appl. No.: 513,918

[52] U.S. Cl. .................. 403/343; 403/332; 403/335
[51] Int. Cl.² .......................................... F16B 7/18
[58] Field of Search ........ 85/46; 403/343, 332, 335, 403/353

[56] References Cited
UNITED STATES PATENTS
2,206,223   7/1940   Dearborn ............................ 403/335

Primary Examiner—Andrew V. Kundrat
Attorney, Agent, or Firm—Thomas W. O'Rourke

[57] ABSTRACT

A structure for securing together components, including flat plate and sheet materials, utilizing complementary undercut threaded portions defined in a substantially flat planar surface in a spiral configuration with one of the threaded portions having the undercut oriented towards the center of the spiral and the complementary threaded portion having the undercut oriented away from the center of the opposite sense spiral, the complementary threads preferably being fully joinable and fully releasable with less than one complete revolution of one threaded portion relative to the other threaded portion and with substantially no axial takeup movement between the components.

5 Claims, 8 Drawing Figures

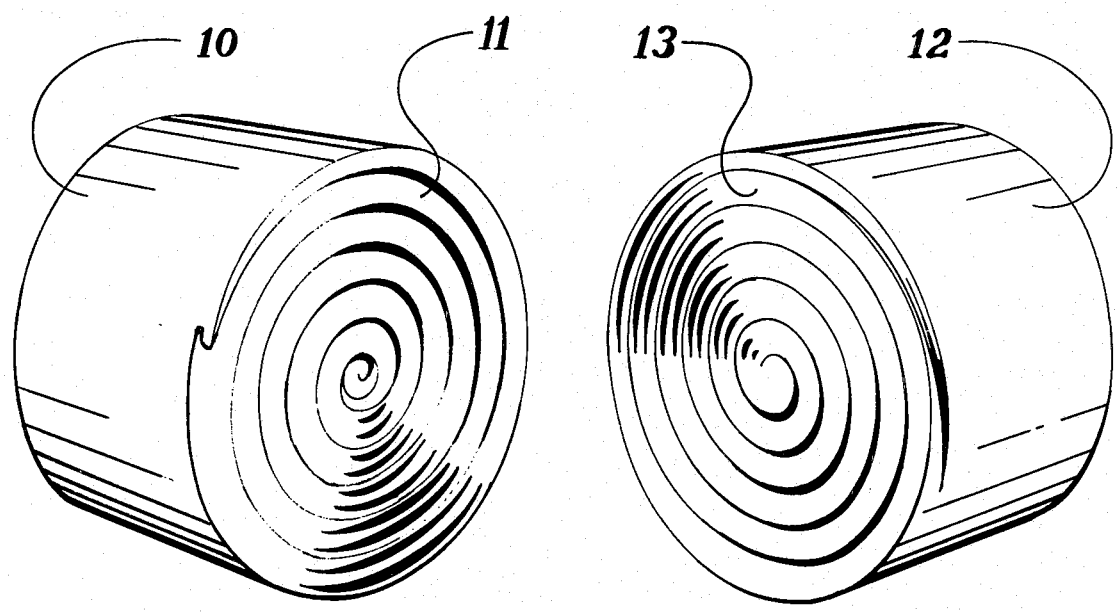
Fig. 1.   Fig. 2.
Fig. 3.
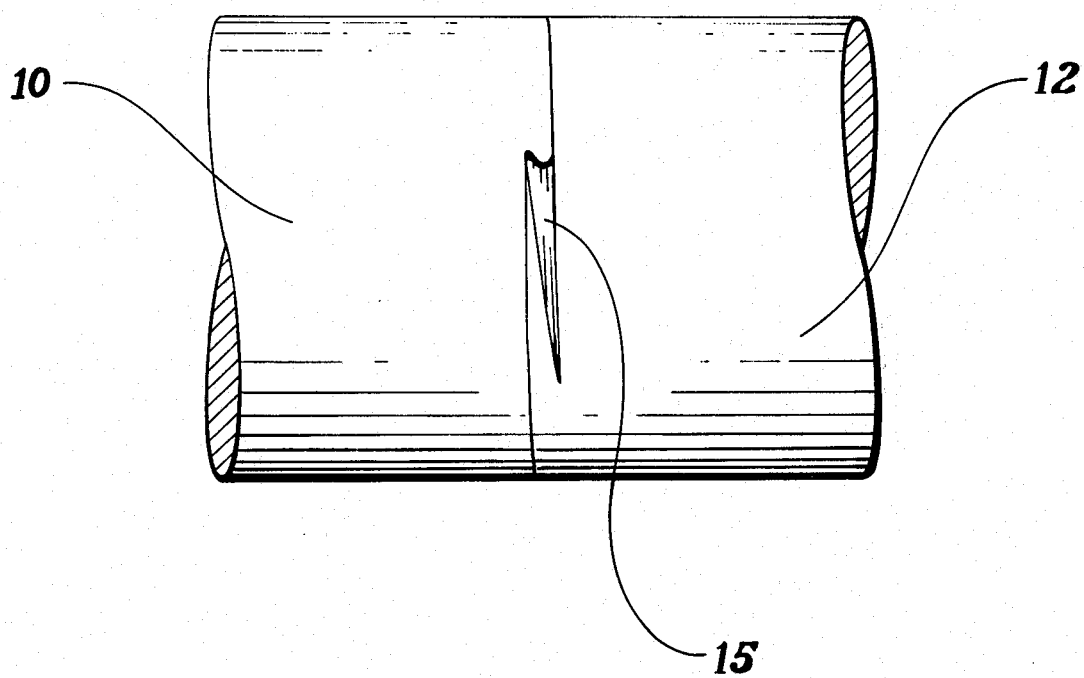

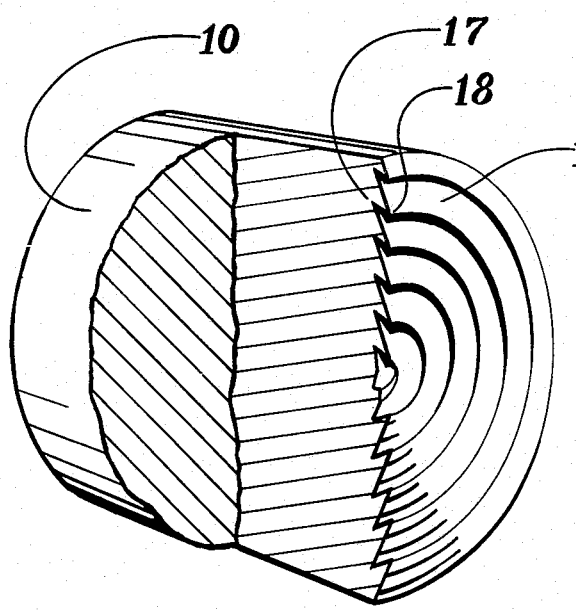
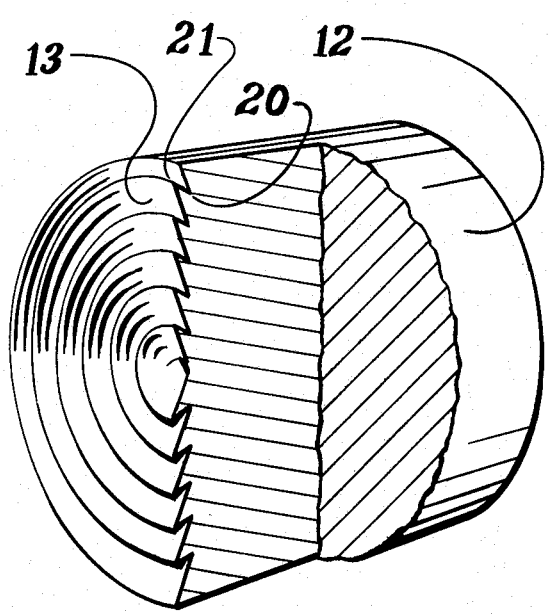
Fig. 4.   Fig. 5.
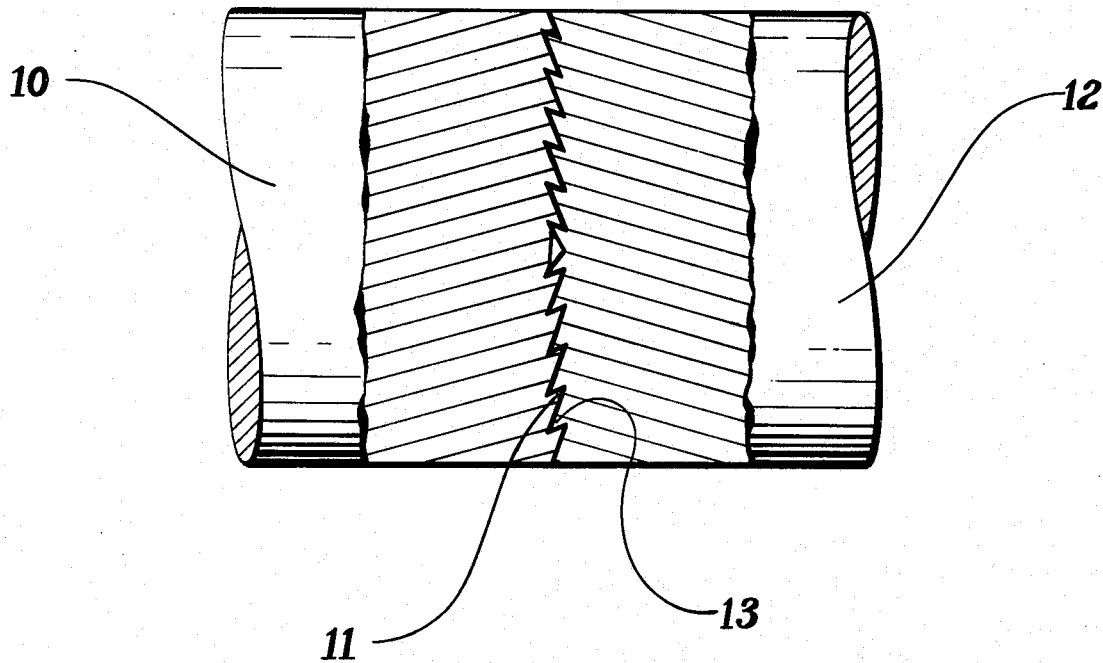
Fig. 6.

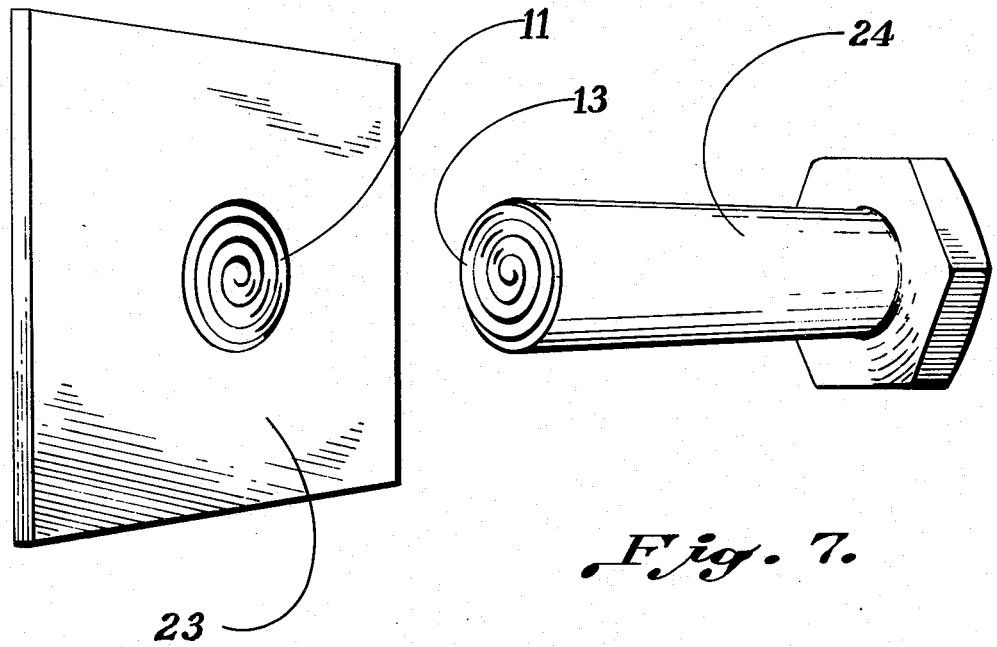
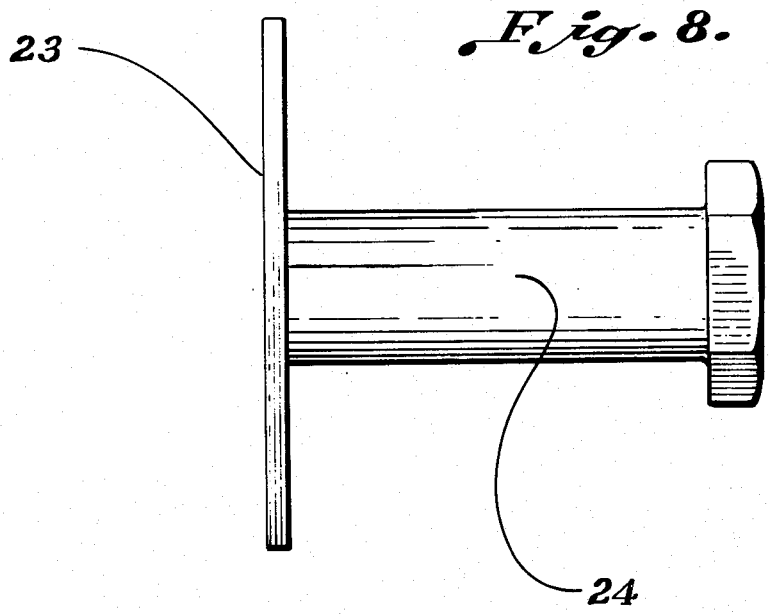

THREADED STRUCTURE

BACKGROUND OF THE INVENTION

1. Field of the Invention

The present invention relates generally to threaded structures, and more particularly to threaded structures in which the threads are defined in essentially flat planes in a spiral manner.

2. Description of the Prior Art

Threaded fasteners and coupling devices have been known for some time. Classically, bolts having helical or spiraling threads defined axially along a generally cylindrical or tapered member, with regard to male threads, and complementary female threads tapped in a bolt or complementary configured hole are, of course, well known. These classical threaded structures require both substantial axial movement and substantial rotary movement of the components of the structure relative to one another as the male threaded member engages the female threaded member. As a result, the surface and strength of the interface between the two is primarily in a cylindrical configuration extending a substantial depth into the structure members. In the case of plate or sheet material, female threads cut therein are of minimal effectiveness as a result of the thinness of the material and are, accordingly, easily stripped.

In the case of joined components which tend to erode, such as the electrodes discussed in U.S. Pat. No. 3,495,123, it is necessary to locate the axially-extending threaded portion inwardly from the surface in that the strength of the threaded connection is, of course, obviated as the portion of the structure containing the threads erodes away. While U.S. Pat. No. 3,495,123 provides a workable compromise in that the threads are positioned within the electrode structure and other means are used to compensate for the lack of strength from such relatively small diameter threads, the patent also points out the shortcomings of such conventional threaded interfaces.

U.S. Pat. No. 2,517,391 2,924,435, 3,140,886 and 3,637,238 illustrate environments in which axially-extending conventional threads are not entirely satisfactory as well as somewhat cumbersome means of avoiding conventional threaded joints, couplings and fastening devices.

SUMMARY OF THE INVENTION

The present invention, which provides a heretofore unavailable means of fastening, attaching or coupling components having integral threaded portions defined therein, comprises complementary threaded portions defined primarily in a flat planar portion and having undercuts in the threads, which extend in a spiral manner, oriented in opposite senses. The structure permits coupling with radially-extending threads which may be joined and released without substantial axial movement and with less than one revolution of one member relative to the other.

Accordingly, an object of the present invention is to provide a new and improved threaded structure for fastening or coupling with minimal axial takeup with flat, planar surface threads.

Another object of the present invention is to provide a new and improved fastening or coupling device which may be secured or released quickly and with minimal rotary motion.

Yet another object of the present invention is to provide a new and improved threaded structure which may be utilized integrally with plates or sheet material.

Still another object of the present invention is to provide a new and improved threaded structure which functions as a ratcheting or transmission device.

Still another object of the present invention is to provide a new and improved threaded structure which is particularly suited for securing together lengths of erodible material such as electrodes.

A further object of the present invention is to provide a new and improved threaded structure particularly suitable for use as a quick-release, blind fastener to thin sheet material.

These and other objects and features of the present invention will become apparent from the following descriptions.

BRIEF DESCRIPTION OF THE DRAWINGS

In the drawings:

FIG. 1 is a perspective view of rod material having the threaded structure of the instant invention defined on one flat planar end surface thereof;

FIG. 2 is a view similar to FIG. 1 with complementary threads having an opposite undercut sense defined therein;

FIG. 3 is a side view of the elements of FIG. 1 and FIG. 2 in the joined position;

FIG. 4 is a view similar to FIG. 1 in which an end portion of the rod material is cut away along a vertical diameter to illustrate more clearly the threaded structure;

FIG. 5 is a view similar to that of FIG. 4 illustrating the threaded structure of FIG. 2;

FIG. 6 is a cutaway view of the elements of FIG. 4 and FIG. 5 in the joined position;

FIG. 7 is an illustration of the threaded structure of the instant invention formed on a plate material and on a cylindrical material; and FIG. 8 is an illustration of the elements of FIG. 7 in the joined position.

DETAILED DESCRIPTION OF THE INVENTION

Turning now to the drawings, wherein like components are designated by like reference numerals throughout the various figures, a bar 10, having threads 11 according to the instant invention defined across the flat, planar end portion thereof, is shown in FIG. 1. Another bar 12, having complementary threads 13 defined similarly in the end portion thereof, is shown in FIG. 2. Threads 11 are, as will be discussed in more detail below, undercut with the undercut oriented towards the center of the spiral form of threads 11. Threads 13 on bar 12 are, while of a similar pitch as threads 11, undercut with the undercut oriented towards the outside of the opposite sense spiral configuration.

As a result of the complementary, undercut threads 11 and 13, bars 10 and 12 may be securely and accurately joined as shown in FIG. 3. Groove 15 is not a necessary feature but results when threads 13 are formed utilizing a lathe cutting tool according to a preferred embodiment of the invention. Other means of forming threads 11 and 13 will be discussed below which do not require the existence of groove 15.

The nature and operation of the instant invention will be more readily and completely understood with reference to FIGS. 4, 5 and 6 which illustrate bars 10 and 12 in the positions of FIGS. 1, 2 and 3, but in a cutaway configuration along a vertical diameter of bars 10 and 12. Threads 11, as will be apparent from FIG. 4, are formed with the root portion 17 spaced radially outward of the corresponding crest portion 18. The resulting undercut from the specific arrangement of root 17 and crest 18 produces the inward orientation of the undercut of bar 10.

Conversely, bar 12 is configured with root 20 spaced radially inward of crest 21. Accordingly, the resulting undercut is complementary to, but of an opposite sense than, that of bar 10. When joined, as shown in FIG. 6, the undercuts of threads 11 and threads 13 interlock; and, when torque is applied between bars 10 and 12, the spiral configuration of threads 11 and threads 13 tend to produce a secure interference fit therebetween in a manner rather analogous to that of conventional axially-extending threads. However, it is possible to obtain substantially 100 percent thread interface between threads 11 and 13 as opposed to the more limited interface between conventional threads.

While threads 11 and threads 13 are illustrated with an identical though opposite configuration, it may be desirable to produce the threads with a somewhat different undercut thereby producing an interference fit. An interference fit would result in a more pronounced distortion before seating of the threads thereby producing an even more secure interlock between bar 10 and bar 12. Non-locking can be provided by threads 11 and 13 cut to preclude interface.

Summarily, in the basic embodiment as illustrated in FIGS. 1 through 6, the invention constitues threads 11 and 13 which extend radially and in an essentially flat, planar surface across the base of bars 10 and 12. Threads 11 have an inwardly-facing undercut and threads 13 have an outwardly-facing undercut. Accordingly, when bars 10 and 12 are placed in engaging relationship, threads 11 and 13 will intermesh loosely. When bar 12 is rotated clockwise relative to bar 10, the spiral relationship of the threads produces an interlocking action which securely attaches the bars together by means of threads 11 and 13. While the flat, planar description is not strictly accurate, in view of the finite depth of threads 11 and 13, for purposes of this discussion it is to be understood that the term contemplates the relatively minor depth of threads 11 and 13. Since the threads 11 and 13 are largely intermeshed before rotation of the bars relative to each other to secure the threads, negligible axial takeup is required from the released to the secured relationship. Also, though the threads are shown as continuous and extending essentially to the center of a solid bar, obviously, the structure could be produced in a discontinuous, segmented fashion, or upon the end walls of, for instance, a cylinder. This would be particularly useful in securing pipes which do not permit the normal, rather extensive axial takeup and/or rotation of conventional threads. Instead, the end walls of the pipe could merely be placed together and secured with most limited axial takeup and rotation.

Another particularly unique and advantageous feature of the instant invention is shown in FIGS. 7 and 8 whereat inwardly-oriented threads 11 are arbitrarily shown defined on a flat plate 23. Outwardly-oriented threads 13 are defined on the end portion of a bolt 24. Accordingly, bolt 24 may be placed against plate 23 and securely attached thereto, as shown in FIG. 8, by rotation without appreciable axial takeup. Since the number of threads are not influenced by the thickness of plate 23, as would be the case with conventional axially-extending threads, a quite secure attachment to a relatively thin plate 23 may be accomplished by this configuration. Two plates could be directly joined in a similar manner.

The threaded structure of the instant invention can be formed in any solid surface. While the thread structure illustrated in the drawings and discussed above is quite strong and fairly readily formed with a simple cutting tool and a lathe, the undercut need not be smooth or continuous. A step function would also serve provided adequate spacing is provided between the threads for the complementary threads to pass therebetween.

Also, it is envisioned that the threads could be formed by initially stamping a simple spiral into a solid surface and rotating the tool to form the undercut. Use of a second tool forming the undercut as a result of rotation of the second tool having the complete thread profile formed thereon is also contemplated.

In the case of plastic materials or formation from molten metal, the member can be cast or molded around a thread mold or die and simply removed therefrom by a rotary movement. Multiple threads can be similarly formed.

In addition to serving as a fastening or coupling interface, it will be recognized that the threaded structure of the instant invention may be rotated indefinitely in one direction with the threads merely overriding one another. However, when rotated in the other direction, as discussed above, the spiral configuration causes the threads to interlock, as illustrated. Accordingly, the threaded structure serves as a ratchet or one-way interface between the two material. Multiple threads would increase the entry points.

Although only two specific embodiments of the present invention have been illustrated and described in detail, it is apparent that various changes and modifications will be readily recognized by those skilled in the art, and that such changes and modifications may be made without departing from the scope of the invention as defined by the following claims.

What is claimed is:

1. A threaded structure, comprising: a first substantially flat surface having undercut threads defined therein in the form of at least a portion of a substantially planar spiral with the undercut oriented towards the center of the spiral; and a second substantially flat surface having undercut threads defined therein complementary to the threads defined in the first surface and in the form of at least a portion of a substantially planar spiral with the undercut oriented away from the center of the spiral, the undercuts of the threads defined in the first and second flat surface, respectively, being at different angles, whereby the first and second surfaces may be positioned together with the threads engaging and, through a minor relative rotation, secured together with substantially no axial takeup and engaging in an interference fit.

2. A threaded structure as set forth in claim 1 in which the first and second flat surfaces are respectively defined on the end portion of first and second bar members.

3. A threaded structure as set forth in claim 1 in which at least one of the first and second substantially flat surfaces comprise the surface of a sheet material.

4. A threaded structure as set forth in claim 3 in which both the first and second flat surfaces with threads defined therein are defined on sheet material.

5. A threaded structure as set forth in claim 1 in which the threads defined in the first and second flat surfaces are substantially continuous and extend substantially to the center of the spiral configuration.

* * * * *

UNITED STATES PATENT OFFICE
CERTIFICATE OF CORRECTION

PATENT NO. : 3,918,823
DATED : November 11, 1975
INVENTOR(S) : Alexander Wilson

It is certified that error appears in the above-identified patent and that said Letters Patent are hereby corrected as shown below:

Column 1, line 42, after "2,517,391" insert --,--.

Column 3, line 20, after "and" insert --threads--.

Column 3, line 23, after "opposite" insert --undercut--.

Signed and Sealed this tenth Day of February 1976

[SEAL]

Attest:

RUTH C. MASON
Attesting Officer

C. MARSHALL DANN
Commissioner of Patents and Trademarks